United States Patent

Dunbar

[15] 3,699,311

[45] Oct. 17, 1972

[54] CODED CARD AND READER THEREFOR

[72] Inventor: Robert A. Dunbar, Swampscott, Mass.

[73] Assignee: Remvac Systems Corporation, Woodside, N.Y.

[22] Filed: Jan. 25, 1971

[21] Appl. No.: 109,114

[52] U.S. Cl.........................235/61.11 H, 340/173 R

[51] Int. Cl...........................G06k 7/08, G11b 23/00

[58] Field of Search................235/61.11 H, 61.11 A; 340/173 SP, 173 R, 347 P

[56] References Cited

UNITED STATES PATENTS

| | | | |
|---|---|---|---|
| 3,519,802 | 7/1970 | Cinque et al........235/61.11 H | |
| 3,531,626 | 9/1970 | Olff et al............235/61.11 A | |

*Primary Examiner*—Daryl W. Cook
*Attorney*—Peter L. Tailer

[57] ABSTRACT

A card contains selectively connected or unconnected plates to encode bits of information. A card reader has a sending plate and a sensing plate for each bit encoded in the card, the plates of the card and the reader forming two capacitors in series to read bits of information encoded in the card. A potential impressed on the sending plate causes a charge redistribution and a momentary current flow which is sensed by a high impedance sensing circuit connected to each sensing plate, the momentary current flow and resulting voltage only being present to be sensed when the plates encoding a bit of information in the card are connected. The sending plates in the card reader and one of the plates encoding each bit of information in the card may be formed as single larger plates.

6 Claims, 10 Drawing Figures

INVENTOR:
ROBERT A. DUNBAR

BY Peter L. Tailer
ATTORNEY

CODED CARD AND READER THEREFOR

BACKGROUND OF THE INVENTION

1. Field of the Invention

Identification cards which have information encoded on them and systems which sense the encoded information are in increasing demand in security, credit card validation, and like systems. The greatest need is for cards which encode information in a manner which is not easily detected and copied. This invention provides a new type of coded cards and readers for them. The readers may use information from a card to unlock a door or for other purposes.

2. Description of the Prior Art

Coded cards with raised portions or perforations in them are well known and they are read by mechanical devices. Cards with exposed electrical contacts are well known. The information encoded in such cards is easily detected. Cards containing magnets are used to encode information, but this may be detected by sprinkling a magnetic powder on the card. The card of this invention encodes information in a new manner.

SUMMARY OF THE INVENTION

A card, which may be an identification card, has bits of information encoded on it, each bit being one plate of each of two capacitors, the coding of a bit being the connection or interruption of the connections between plates in the card. With multiple bits encoded in a single card, one plate encoding each of the bits may be formed as a single contiguous plate.

A reader for the card has two plates for each bit, one of which is a sending plate and the other a sensing plate. The plates in the reader and the plates in the card are disposed adjacent to each other to form two capacitors in series for each encoded bit. The sending plates in the card reader may be formed as a single contiguous plate.

The card reader impresses a potential on the sending plate or plates which redistributes a charge in each series connected pair of capacitors formed by the plates of the card and the reader, the charge redistribution only taking place when the plates in the card are connected to encode a bit. The charge redistribution causes a momentary current flow and a voltage at corresponding sensing plates which is sensed by high impedance sensing circuits.

The information encoded in a card of this invention is particularly hard to detect. The capacitor plates in the card are of very thin non-magnetic material which may be laminated between opaque layers. X-rays may be stopped by providing an X-ray impervious layer in the card. Thus a bit pattern cannot be detected without the destruction of a card.

DESCRIPTION OF THE PREFERRED EMBODIMENT

Figures 1, 2, 3, 4, 5, 6, 7, 8, 9, 10:
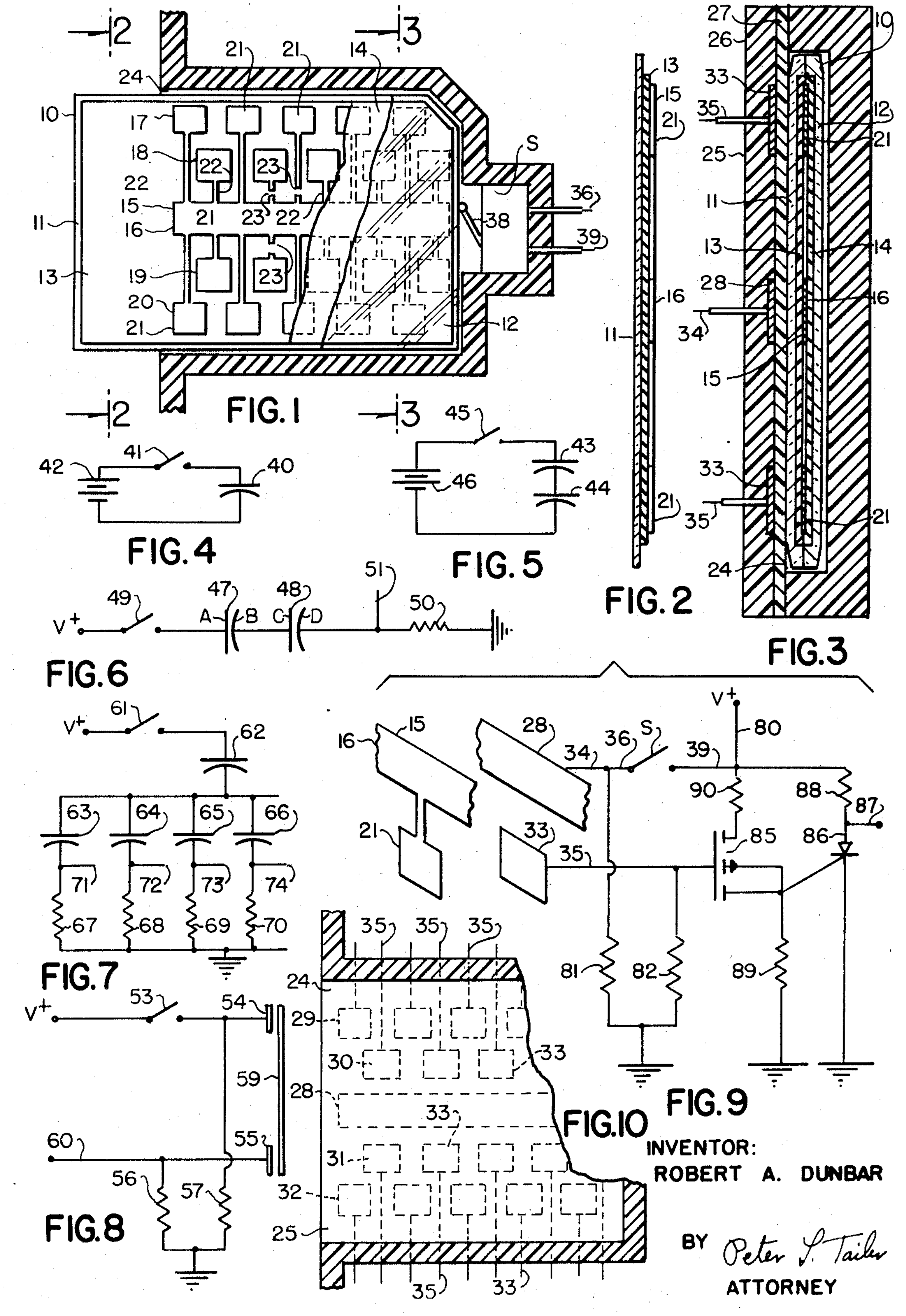
FIG. 1 is a horizontal section through the card receiving slot of a fragment of a card reader having a card inserted therein, the card having portions of an upper transparent layer and an upper paper layer peeled away.
FIGS. 2 and 3 are, respectively sections taken on lines 2—2 and 3—3 of FIG. 1.
FIGS. 4, 5, 6, 7 and 8 are circuit diagrams illustrating the theory of this invention.
FIG. 9 is a schematic diagram showing circuitry within the card reader to sense one bit of coded information in a card.
FIG. 10 is a horizontal section through a fragment of a card receiving slot of the card reader of FIG. 1 showing a sending plate and sensing plates embedded therein.

As may be seen in FIGS. 1, 2 and 3, the card 10 is formed by laminating two layers of plastic 11 and 12 about two layers of paper 13 and 14. Layers 13 and 14 may have conventional printing on them to show through the plastic outer layers 11 and 12 to have the same appearance as a standard identification or credit card. Layer 13 has plates 15 of metal or other conductive material formed thereon to encode detectable or readable information within the card 10. The relative thickness of card 10 is greatly exaggerated in FIGS. 2 and 3.

As shown in FIG. 1, a central plate 16 has the rows 17–20 of plates 21 formed on both sides of it. Thin connecting strips 22 connect each plate 21 with the central plate 16. The connecting strips 22 are either allowed to remain unbroken or they are interrupted or formed with a break, as at 23, to encode information in card 10.

The plates 16 and 21 and the strips 22 may be of any metal or conductive material suitable to form plates of a capacitor. As one example, these plates 16 and 21 could be a plated copper foil. As capacitor plates, their thickness is not of importance. Thus the plates 15 may be screened or printed in conductive ink, be etched in a desired configuration, or otherwise formed. The breaks 23 which encode information may be formed with the plates 15 or they may be made by merely scratching the surface of layer 13 through selected strips 22 before laminating the card 10.

Referring to FIGS. 1, 3 and 10, the card reader of this invention has a card receiving slot 24 formed between a base 25 and a cover 26 of plastic or other insulating material. Base 25 may have two layers 26 and 27 between which there is embedded a central sending plate 28 and four rows 29–32 of sensing plates 33, the plates 28 and 33 corresponding to the plates 15 and 21 in card 10. Plate 28 is connected to a lead 34 and each sensing plate 33 is connected to a lead 35. The corner 37 of card 10 ensures that it is properly oriented to be able to be inserted all the way into slot 24 to close the switch S by engaging its contact arm 38. Leads 36 and 39 extend from switch S.

FIG. 4 shows a capacitor 40 which may be connected by a switch 41 to a battery 42. On the closing of switch 41, a current will flow in this circuit until capacitor 40 is charged with the voltage across its plates equalling that across the terminals of battery 42.

FIG. 5 shows capacitors 43 and 44 connected in series by switch 45 to battery 46. On closing switch 45 a current will flow until the sum of the voltages across the plates of both capacitors 43 and 44 equals the voltage of battery 46.

FIG. 6 also shows two capacitors 47 and 48 having a voltage V which is positive impressed on them on the closing of switch 49. Capacitors 47 and 48 are connected in series so that a current will flow through resistance 50 during the time it takes to charge them. Lead 51 may be used to sense the voltage across resistance 50 during the very short interval that current flows. Considering plates A and B of capacitor 48 and plates C and D of capacitor 49, plate A will be positive, plate B will be negative, plate C will be positive, and plate D will be negative. A voltmeter would indicate a voltage equal to V between plates A and D which would be equal to the sum of the voltages between A and B and between C and D. There is no net voltage difference between B and C, there is only a redistribution of charge between these two plates.

Referring now to FIG. 8, before the closing of switch 53, sending plate 54 and receiving plate 55 are both at ground potential being grounded by resistances 56 and 57. The closing of switch 58 charges plate 54 relative to plate 59 and charges plate 59 relative to plate 55. The current and resulting voltage resulting from the charging of the plates may be sensed at lead 60. Plate 59 has it total charge redistributed to be negative opposite plate 54 and positive opposite plate 55.

As shown in FIG. 7, the closing of switch 61 charges capacitors 62–66 through the resistors 67–70. While the capacitors 63–66 are charging a voltage may be sensed through the leads 71–74.

The coded card 10 of this invention and its reader together provide two capacitors connected in series to indicate each bit of information. The capacitors are charged in the same manner which has been described in connection with FIGS. 5–8. For example, sending plate 28 of the card reader and central plate 16 of the card 10 correspond, respectively, to the plates A and B of capacitor 47 of FIG. 6 or to the plates of capacitor 62 of FIG. 7. In a like manner, each plate 21 of card 10 and a corresponding plate 33 of the card reader function in the same manner as the plates of the capacitor 48 or one of the capacitors 63–66.

FIG. 9 shows circuitry which senses each bit encoded in a card 10. Voltage V from lead 80 on closing of switch S by insertion of a card 10 causes a charge redistribution in the plates 15 of card 10 which is sensed at each lead 35, plates 28 and 16 forming a first capacitor and each pair of plates 21 and 33 forming a second capacitor in series therewith. Sending plate 28 is grounded through resistor 81 and each receiving or sensing plate 33 is grounded through a resistor 82. Current flow, during charge redistribution on closing of switch S, is sensed across resistor 82 through lead 35. It is to be noted that there is no net change in the charge in the plates 15 of the card 10.

The realignment of the charge results in a very small current flow which produces a voltage which lasts only as long as it takes charge redistribution to take place in plates 15 of card 10. This time is a function of the plate area within card 10, the gap between the card plates 16 and 21, and the impedance at the input of the sensing circuit. A high impedance circuit is required to enable the pulse to be of sufficient duration to be easily sensed. As shown in FIG. 9, such a circuit may include MOS-FET of J-FET devices 85 or conventional transistors with high Hfe used in an emitter follower configuration. These devices 85 drive the gate of an SCR 86 which stores the information presented by each plate 21 of a card 10. The stored information from SCR 86 is sensed through lead 87. The resistors 88, 89 and 90 are as conventionally required in circuitry of this nature.

As has been explained, card 10 is coded by breaks 23 which are formed before the lamination of the card. Each break 23 selectively prevents charge redistribution to a given plate 21. Thus, as shown, card 10 may be encoded with a pattern of twenty "yes" or "no" bits to be used for identification. With well known circuitry, only one given pattern out of the many possible may be made to unlock a door or accomplish any other desired result. Plate 16 may be made as a number of separate plates, each of which could be connected to one or more plates 21 by strips 22. In a like manner, sending plate 28 could be formed as a number of separate plates, one element of plate 28 corresponding to an element of plate 16.

While this invention has been shown and described in the best form known, it will nevertheless be understood that this is purely exemplary and that modifications may be made without departing from the spirit and scope of the invention.

What is claimed is:

1. A card having bits of information encoded therein and a reader for said card comprising, in combination, a card containing selectively connected plates disposed in a single layer for each bit encoded therein, a card reader having at least one sending plate and a sensing plate for each bit encoded in said card, said at least one sending plate and said sensing plates being substantially the same shape and size as and corresponding to said plates in said card when said card is presented to said card reader, said plates in said card and said card reader forming two capacitors selectively connected in series for each bit encoded in said card, means impressing a voltage on said at least one sending plate, and means to sense a resulting momentary current flow and voltage from said sensing plates to read the bits of information encoded in said card.

2. The combination according to claim 1 wherein one of each of said selectively connected plates in said card is formed as a single plate, said at least one sending plate of said card reader being a single plate corresponding to said single plate of said card.

3. The combination according to claim 2 with the addition of selectively interrupted strips in said card connecting said single plate in said card to each other plate in said card.

4. The combination according to claim 3 wherein said single plate in said card is elongated, other plates in said card being disposed in rows parallel to said single plate, said connecting strips extending from said single plate to each other plate in said card.

5. The combination according to claim 4 wherein said plates in adjacent rows are staggered relative to each other, said connecting strips extending between plates of rows closer to said single plate to the plates of more distant rows.

6. The combination according to claim 5 wherein said single plate in said card is a central plate, said rows of plates being disposed on both sides thereof.

* * * * *